United States Patent
Nanda et al.

(10) Patent No.: US 10,264,020 B1
(45) Date of Patent: Apr. 16, 2019

(54) SYSTEMS AND METHODS FOR SCALABLE NETWORK MONITORING IN VIRTUAL DATA CENTERS

(71) Applicant: Symantec Corporation, Mountain View, CA (US)

(72) Inventors: Susanta K. Nanda, Los Angeles, CA (US); Yuqiong Sun, State College, PA (US)

(73) Assignee: Symantec Corporation, Mountain View, CA (US)

(*) Notice: Subject to any disclaimer, the term of this patent is extended or adjusted under 35 U.S.C. 154(b) by 257 days.

(21) Appl. No.: 14/614,819

(22) Filed: Feb. 5, 2015

(51) Int. Cl.
*H04L 29/06* (2006.01)
*H04L 12/26* (2006.01)

(52) U.S. Cl.
CPC ............ *H04L 63/20* (2013.01); *H04L 43/04* (2013.01); *H04L 43/0876* (2013.01); *H04L 63/1408* (2013.01)

(58) Field of Classification Search
CPC .................................. H04L 29/00; G06F 9/00
See application file for complete search history.

(56) References Cited

U.S. PATENT DOCUMENTS

| 7,808,897 | B1 | 10/2010 | Mehta et al. |
| 8,565,108 | B1 | 10/2013 | Marshall et al. |
| 8,689,282 | B1 | 4/2014 | Oprea et al. |
| 2007/0130566 | A1* | 6/2007 | van Rietschote ... G06F 9/45533 718/1 |
| 2012/0317566 | A1 | 12/2012 | Santos et al. |
| 2014/0029451 | A1 | 1/2014 | Nguyen |
| 2014/0115183 | A1* | 4/2014 | Mitsunobu ............ H04L 47/621 709/232 |
| 2014/0150081 | A1 | 5/2014 | Cooley |
| 2014/0229605 | A1 | 8/2014 | Besser |

(Continued)

OTHER PUBLICATIONS

Susanta K. Nanda, et al; Systems and Methods for Monitoring Virtual Networks; U.S. Appl. No. 14/587,048, filed Dec. 31, 2014.

(Continued)

*Primary Examiner* — Edward Zee
*Assistant Examiner* — Leynna T Truvan
(74) *Attorney, Agent, or Firm* — FisherBroyles, LLP

(57) ABSTRACT

A computer-implemented method for scalable network monitoring in virtual data centers may include (1) identifying a plurality of network monitoring agents executing on a plurality of virtual machine host systems within a virtual data center, (2) intercepting, at a receiving virtual machine host system, a traffic flow within a virtual network within the virtual data center, (3) determining a processor load on each of the plurality of virtual machine host systems, (4) selecting, based on the processor load on the receiving virtual machine host system exceeding an established threshold, an alternate virtual machine host system that executes a second network monitoring agent for inspecting the traffic flow, and (5) limiting the processor load on the receiving virtual machine host system by designating the second network monitoring agent executing on the alternate virtual machine host system to inspect the traffic flow. Various other methods, systems, and computer-readable media are also disclosed.

19 Claims, 7 Drawing Sheets

(56) References Cited

U.S. PATENT DOCUMENTS

2014/0317737 A1    10/2014    Shin et al.
2016/0191545 A1*    6/2016    Nanda .................. H04L 63/145
                                                                                          726/1

OTHER PUBLICATIONS

"Open source software for creating private and public clouds.", http://www.openstack.org/, as accessed Nov. 6, 2014, OpenStack, (Jul. 24, 2002).

McKeown, Nick et al., "OpenFlow: Enabling Innovation in Campus Networks", http://archive.openflow.org/documents/openflow-wp-latest.pdf, as accessed Nov. 6, 2014, (Mar. 14, 2008).

"Network packet", http://en.wikipedia.org/wiki/Network_packet, as accessed Nov. 6, 2014, Wikipedia, (Feb. 21, 2011).

"OSI model", http://en.wikipedia.org/wiki/OSI_model, as accessed Nov. 6, 2014, Wikipedia, (Jan. 13, 2004).

"What's Software-Defined Networking (SDN)?", https://www.sdxcentral.com/resources/sdn/what-the-definition-of-software-defined-networking-sdn/, as accessed Nov. 6, 2014, (2012).

"Software-defined networking", http://en.wikipedia.org/wiki/Software-defined_networking, as accessed Nov. 6, 2014, Wikipedia, (Nov. 11, 2012).

"Cloud computing", http://en.wikipedia.org/wiki/Cloud_computing, as accessed Nov. 6, 2014, Wikipedia, (Oct. 12, 2007).

"What is the difference between a modem/router/switch/WAP?", http://whirlpool.net.au/wiki/dsl_modems03_01, as accessed Nov. 6, 2014, (on or before Nov. 6, 2014).

"VCloud Director", http://www.vmware.com/products/vcloud-director, as accessed Nov. 6, 2014, VMware, Inc., (Aug. 31, 2010).

* cited by examiner

SYSTEMS AND METHODS FOR SCALABLE NETWORK MONITORING IN VIRTUAL DATA CENTERS

BACKGROUND

Network monitoring may provide a basis for a variety of security services, such as Intrusion Detection Systems (IDS) and Data Loss Prevention (DLP) services. Security administrators and enterprises may monitor physical network connections in a variety of ways, such as by directly tapping network cables or by placing wiretap mechanisms within network devices. Such wiretap mechanisms may be designed to monitor and/or record data handled by specific ports within switches, routers, and other network devices.

Unfortunately, traditional methods for monitoring physical networks may be ineffective and/or unusable when applied to virtual networks. For example, virtual network connections may not have physical wires on which to place a tapping mechanism. In addition, a virtual network device may not correspond to or map to any physical network device. As a result, the virtual network device may be incompatible with network monitoring techniques designed for certain physical devices.

Furthermore, conventional methods for monitoring virtual ports may be unable to effectively monitor heavy flows of network traffic, such as the network loads within cloud-computing environments. For example, a virtual network device may facilitate access to large numbers of ports compared to physical network devices. As the size of cloud-based platforms grow, traditional virtual port-based filters (that may be based on physical filtering mechanisms) may increasingly be unable to efficiently and accurately detect security threats. Accordingly, the instant disclosure identifies and addresses a need for additional and improved systems and methods for scalable network monitoring in virtual data centers.

SUMMARY

As will be described in greater detail below, the instant disclosure generally relates to systems and methods for scalable network monitoring in virtual data centers by designating network monitoring agents within virtual data centers to inspect traffic flows destined for virtual machine host systems based on the virtual machine host system that sends the traffic flow, the relative network location of the virtual machine host system that receives the traffic flow, the relative network placement of the virtual machine host systems within the virtual data center, and/or the processor loads on the virtual machine host systems within the virtual data center.

In one example, a computer-implemented method for scalable network monitoring in virtual data centers may include (1) identifying a plurality of network monitoring agents executing on a virtual machine host systems within a virtual data center, (2) intercepting, at a receiving virtual machine host system within the plurality of virtual machine host systems, a traffic flow within a virtual network that is hosted within the virtual data center, where the receiving virtual machine host system executes a first network monitoring agent within the network monitoring agents that inspects traffic flows received at the receiving virtual machine host system, (3) determining a processor load on each of the virtual machine host systems, (4) selecting, based on the processor load on the receiving virtual machine host system exceeding an established threshold, an alternate virtual machine host system that executes a second network monitoring agent for inspecting the traffic flow, and (5) limiting the processor load on the receiving virtual machine host system by designating the second network monitoring agent executing on the alternate virtual machine host system to inspect the traffic flow on behalf of the receiving virtual machine host system.

In some examples, designating the second network monitoring agent executing on the alternate virtual machine host system to inspect the traffic flow may include (1) determining that the alternate virtual machine host system sends the traffic flow to the receiving virtual machine host system and (2) selecting the second network monitoring agent executing on the alternate virtual machine host system to inspect the traffic flow based on determining that the alternate virtual machine host system sends the traffic flow to the receiving virtual machine host system and based on the processor load on the alternate virtual machine host system.

In some examples, designating the second network monitoring agent executing on the alternate virtual machine host system to inspect the traffic flow may include (1) determining that a sending virtual machine host system sends the traffic flow to the receiving virtual machine host system, (2) eliminating the sending virtual machine host system as a candidate for inspecting the traffic flow to the receiving virtual machine host system based on the processor load on the sending virtual machine host system, and (3) forwarding the traffic flow to the second network monitoring agent executing on the alternate virtual machine host system based on having eliminated both the receiving virtual machine host system and the sending virtual machine host system as candidates for inspecting the traffic flow.

In some examples, designating the second network monitoring agent executing on the alternate virtual machine host system to inspect the traffic flow further may include selecting the second network monitoring agent executing on the alternate virtual machine host system to inspect the traffic flow instead of an additional candidate network monitoring agent executing on an additional candidate virtual machine host system based at least in part on a number of network hops between the receiving virtual machine host system and the additional candidate network monitoring agent exceeding a number of network hops between the receiving virtual machine host system and the alternate virtual machine host system.

In one embodiment, each network monitoring agent within the network monitoring agents may inspect traffic flows by (1) providing, within a virtualized switching device that routes network traffic from a source port within the virtual network to a destination port within the virtual network, a set of software-defined-network rules containing packet inspection criteria, (2) intercepting, at the source port, a packet destined for the destination port, (3) determining that at least one characteristic of the packet satisfies at least one of the rules, and (4) in response to determining that the characteristic of the packet satisfies at least one of the rules, forwarding a copy of the packet to a virtual tap port that analyzes the copy of the packet.

In one embodiment, the first network monitoring agent may inspect traffic flows received at the receiving virtual machine host system for compliance with at least one security policy and the second network monitoring agent may inspect the traffic flow on behalf of the receiving virtual machine host system for compliance with the security policy.

In one embodiment, the computer-implemented method may further include determining, at the second network monitoring agent, that the traffic flow violates the security policy and performing a security action in response to determining that the traffic flow violates the security policy.

In some examples, determining the processor load on each of the virtual machine host systems may include (1) receiving, at a central management system, processor load information for each virtual machine host system from the network monitoring agents and (2) receiving, from the central management system, information differentiating the alternate virtual machine host system within the plurality of virtual machine host systems based on the processor load on the alternate virtual machine host system.

In some examples, intercepting the traffic flow may include determining that the traffic flow is subject to inspection based on the traffic flow being received at the receiving virtual machine host system.

In some examples, intercepting the traffic flow may include determining that the traffic flow is subject to inspection based on (1) a protocol of the traffic flow, (2) an application that originated the traffic flow, (3) a geographic region from which the traffic flow originated, and/or (4) a geographic region to which the traffic flow is directed.

In one embodiment, a system for implementing the above-described method may include (1) an identification module, stored in memory, that identifies a plurality of network monitoring agents executing on a virtual machine host systems within a virtual data center, (2) an interception module, stored in memory, that intercepts, at a receiving virtual machine host system within the plurality of virtual machine host systems, a traffic flow within a virtual network that is hosted within the virtual data center, where the receiving virtual machine host system executes a first network monitoring agent within the network monitoring agents that inspects traffic flows received at the receiving virtual machine host system, (3) a determination module, stored in memory, that determines a processor load on each of the virtual machine host systems, (4) a selection module, stored in memory, that selects, based on the processor load on the receiving virtual machine host system exceeding an established threshold, an alternate virtual machine host system that executes a second network monitoring agent for inspecting the traffic flow, (5) a limitation module, stored in memory, that limits the processor load on the receiving virtual machine host system by designating the second network monitoring agent executing on the alternate virtual machine host system to inspect the traffic flow on behalf of the receiving virtual machine host system, and (6) at least one physical processor configured to execute the identification module, the interception module, the determination module, the selection module, and the limitation module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) identify a plurality of network monitoring agents executing on a virtual machine host systems within a virtual data center, (2) intercept, at a receiving virtual machine host system within the plurality of virtual machine host systems, a traffic flow within a virtual network that is hosted within the virtual data center, where the receiving virtual machine host system executes a first network monitoring agent within the network monitoring agents that inspects traffic flows received at the receiving virtual machine host system, (3) determine a processor load on each of the virtual machine host systems, (4) select, based on the processor load on the receiving virtual machine host system exceeding an established threshold, an alternate virtual machine host system that executes a second network monitoring agent for inspecting the traffic flow, and (5) limit the processor load on the receiving virtual machine host system by designating the second network monitoring agent executing on the alternate virtual machine host system to inspect the traffic flow on behalf of the receiving virtual machine host system.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
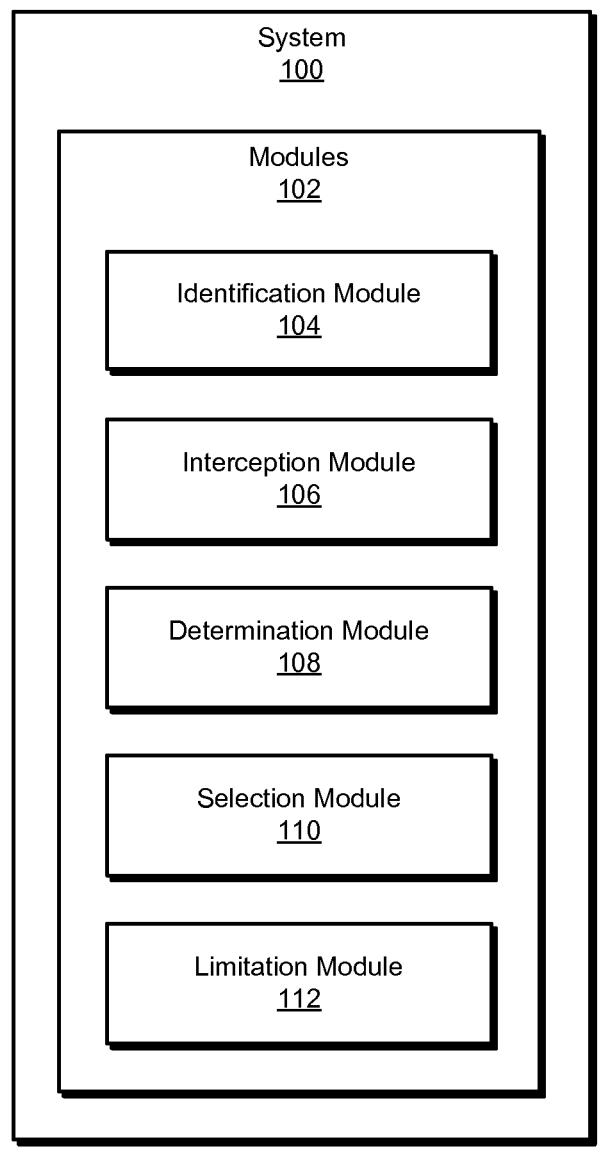
FIG. 1 is a block diagram of an exemplary system for scalable network monitoring in virtual data centers.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for scalable network monitoring in virtual data centers. As will be explained in greater detail below, by designating network monitoring agents within virtual data centers to inspect traffic flows destined for virtual machine host systems based on the virtual machine host system that sends the traffic flow, the relative network location of the virtual machine host system that receives the traffic flow, the relative network placement of the virtual machine host systems within the virtual data center, and/or the processor loads on the virtual machine host systems within the virtual data center, the systems and methods described herein may facilitate the monitoring of network traffic within virtual data centers while minimizing the impact on both primary application performance and network usage.

The following will provide, with reference to FIGS. 1, 2, 4, and 5, detailed descriptions of exemplary systems for scalable network monitoring in virtual data centers. Detailed descriptions of corresponding computer-implemented methods will also be provided in connection with FIG. 3. In addition, detailed descriptions of an exemplary computing system and network architecture capable of implementing one or more of the embodiments described herein will be provided in connection with FIGS. 6 and 7, respectively.

FIG. 1 is a block diagram of exemplary system 100 for scalable network monitoring in virtual data centers. As illustrated in this figure, exemplary system 100 may include one or more modules 102 for performing one or more tasks. For example, and as will be explained in greater detail below, exemplary system 100 may also include an identification module 104 that may identify a plurality of network monitoring agents executing on a plurality of virtual machine host systems within a virtual data center. Exemplary system 100 may additionally include an interception module 106 that may intercept, at a receiving virtual machine host system within the plurality of virtual machine host systems, a traffic flow within a virtual network that may be hosted within the virtual data center, where the receiving virtual machine host system executes a first network monitoring agent within the plurality of network monitoring agents that inspects traffic flows received at the receiving virtual machine host system. Exemplary system 100 may also include a determination module 108 that may determine a processor load on each of the plurality of virtual machine host systems. Exemplary system 100 may additionally include a selection module 110 that may select, based on the processor load on the receiving virtual machine host system exceeding an established threshold, an alternate virtual machine host system that executes a second network monitoring agent for inspecting the traffic flow. Exemplary system 100 may also include a limitation module 112 that may limit the processor load on the receiving virtual machine host system by designating the second network monitoring agent executing on the alternate virtual machine host system to inspect the traffic flow on behalf of the receiving virtual machine host system. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., central management system 202 and/or virtual machine host systems 212(1)-(*n*)), computing system 610 in FIG. 6, and/or portions of exemplary network architecture 700 in FIG. 7. One or more of modules 102 in FIG. 1 may also represent all or portions of one or more special-purpose computers configured to perform one or more tasks.

Figure 2:
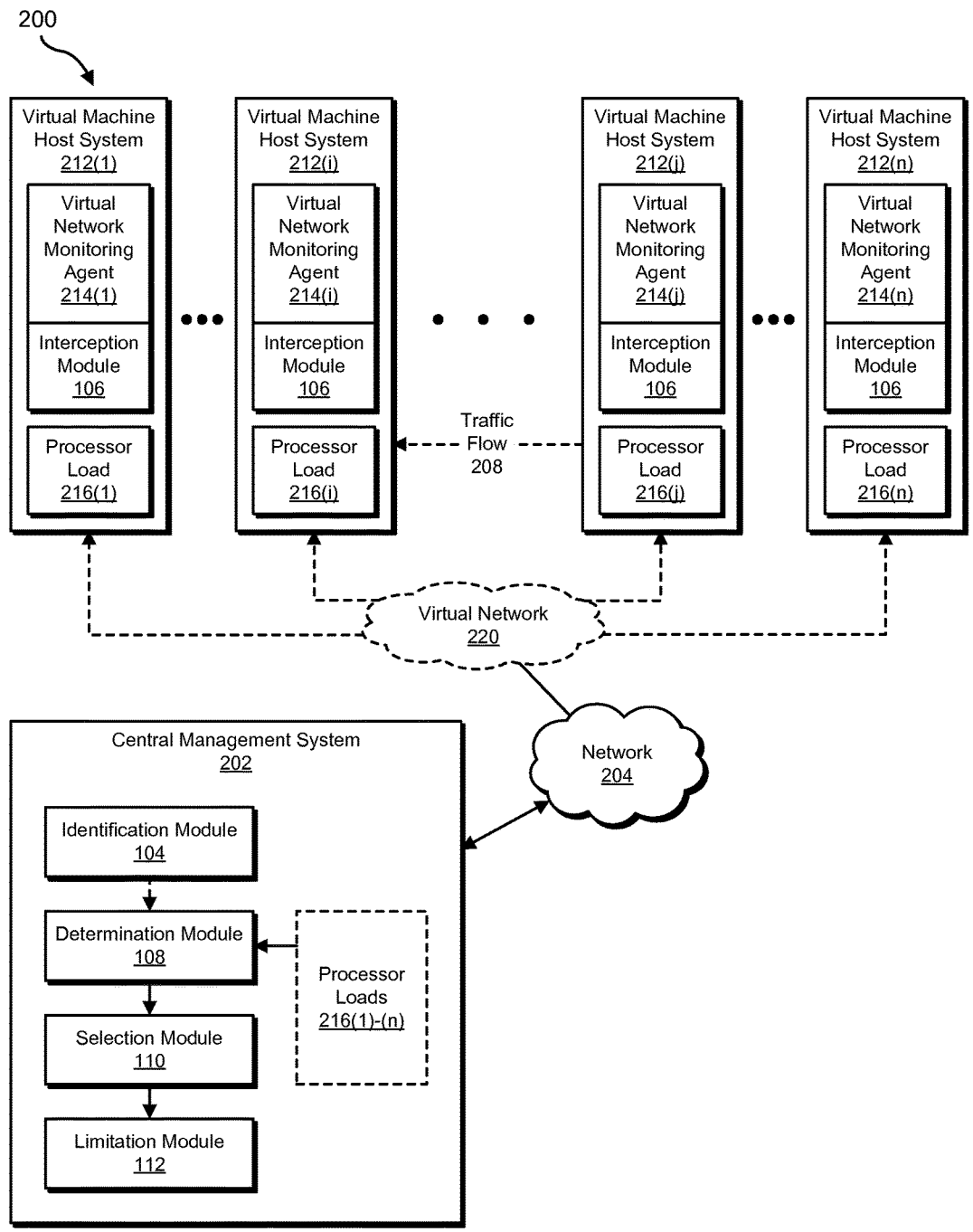
FIG. 2 is a block diagram of an additional exemplary system for scalable network monitoring in virtual data centers.

Exemplary system 100 in FIG. 1 may be implemented in a variety of ways. For example, all or a portion of exemplary system 100 may represent portions of exemplary system 200 in FIG. 2. As shown in FIG. 2, system 200 may include a central management system 202 in communication with virtual machine host systems 212(1)-(*n*) via a network 204. In one example, central management system 202 may be programmed with one or more of modules 102. Additionally or alternatively, virtual machine host systems 212(1)-(*n*) may be programmed with one or more of modules 102.

In one embodiment, one or more of modules 102 from FIG. 1 may, when executed by at least one processor of central management system 202 and/or virtual machine host systems 212(1)-(*n*), enable central management system 202 and/or virtual machine host systems 212(1)-(*n*) to perform scalable network monitoring in virtual data centers. For example, and as will be described in greater detail below, one or more of modules 102 may cause central management system 202 and/or virtual machine host systems 212(1)-(*n*) to monitor networks in virtual data centers. For example, and as will be described in greater detail below, identification module 104 may identify a plurality of virtual network monitoring agents 214 executing on a plurality of virtual machine host systems 212 within a virtual data center 210. Interception module 106 may intercept, at a receiving virtual machine host system 212(*i*) within the plurality of virtual machine host systems 212, a traffic flow 208 within a virtual network 220 that is hosted within virtual data center 210, where receiving virtual machine host system 212(*i*) executes a first virtual network monitoring agent 214(*i*) within the plurality of virtual network monitoring agents 214 that inspects traffic flows received at receiving virtual machine host system 212(*i*). Determination module 108 may determine a processor load 216(1)-(*n*) on each of the plurality of virtual machine host systems 212(1)-(*n*). Selection module 110 may select, based on processor load 216(*i*) on receiving virtual machine host system 212(*i*) exceeding an established threshold, an alternate virtual machine host system 212(*j*) that executes a second virtual network monitoring agent 214(*j*) for inspecting traffic flow 208. Limitation module 112 may limit processor load 216(*i*) on receiving virtual machine host system 212(*i*) by designating the second virtual network monitoring agent 214(*j*) executing on alternate virtual machine host system 212(*j*) to inspect traffic flow 208 on behalf of receiving virtual machine host system 212(*i*).

Central management system 202 generally represents any type or form of computing device capable of reading computer-executable instructions. Examples of central management system 202 include, without limitation, laptops, tablets, desktops, servers, cellular phones, Personal Digital Assistants (PDAs), multimedia players, embedded systems, wearable devices (e.g., smart watches, smart glasses, etc.), gaming consoles, combinations of one or more of the same, exemplary computing system 610 in FIG. 6, or any other suitable computing device.

Virtual machine host systems 212(1)-(*n*) generally represent any type or form of computing device that is capable of hosting and/or executing a virtual machine. Examples of virtual machine host systems 212(1)-(*n*) include, without limitation, hardware hypervisors, computing systems that host hypervisors, and virtual machine monitors.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 700 in FIG. 7, or the like. Network 204 may facilitate communication or data transfer using wireless or wired connections. In one embodiment, network 204 may facilitate communication between central management system 202 and virtual machine host systems 212(1)-(n).

Figure 3:
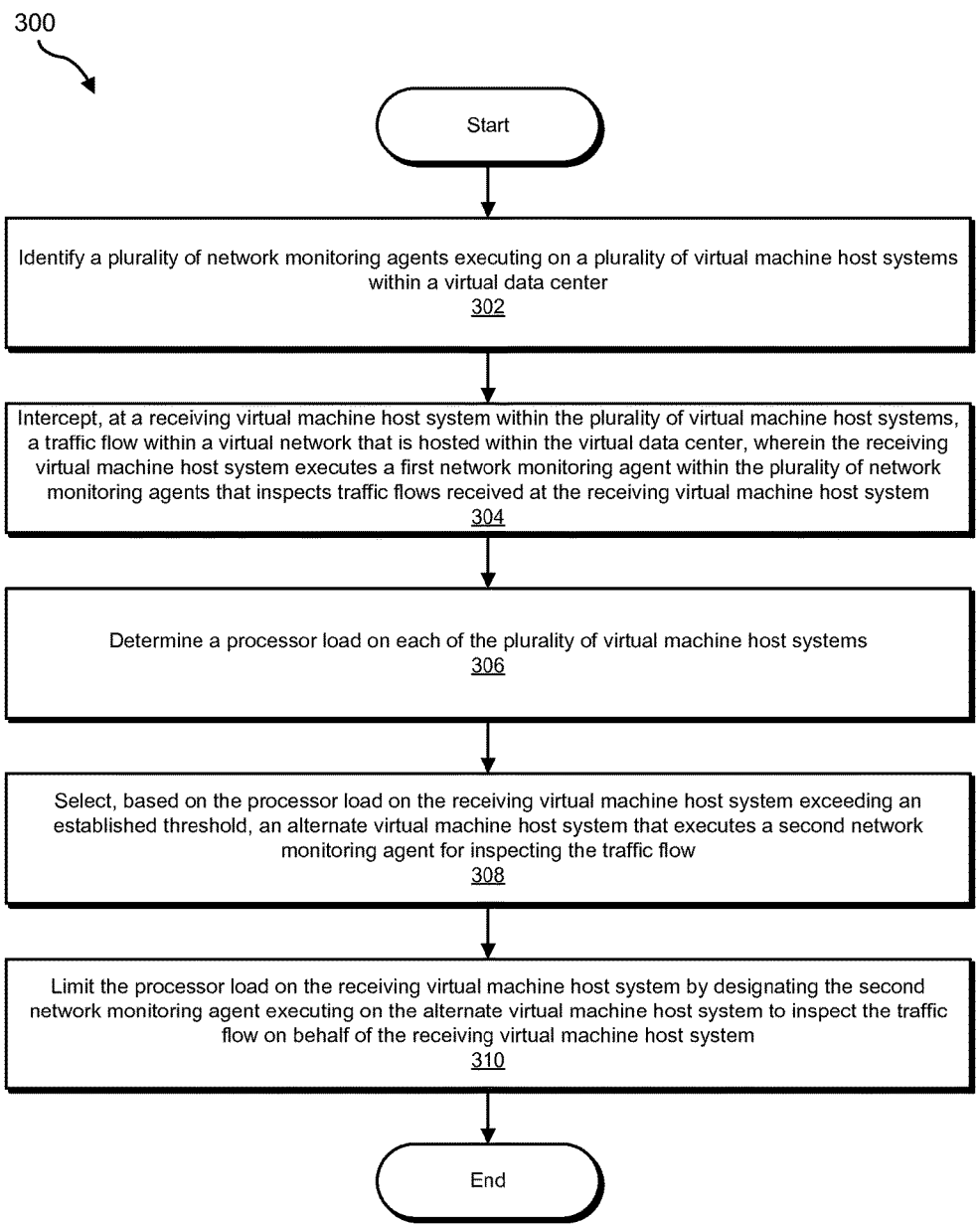
FIG. 3 is a flow diagram of an exemplary method for scalable network monitoring in virtual data centers.

FIG. 3 is a flow diagram of an exemplary computer-implemented method 300 for scalable network monitoring in virtual data centers. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 610 in FIG. 6, and/or portions of exemplary network architecture 700 in FIG. 7.

As illustrated in FIG. 3, at step 302, one or more of the systems described herein may identify a plurality of network monitoring agents executing on a plurality of virtual machine host systems within a virtual data center. For example, identification module 104 may, as part of central management system 202 in FIG. 2, identify a plurality of virtual network monitoring agents 214 executing on a plurality of virtual machine host systems 212 within virtual data center 210.

Identification module 104 may identify the plurality of network monitoring agents in any of a variety of ways. For example, identification module 104 execute on a central management system in communication with each of the plurality of network monitoring agents. In some examples, each network monitoring agent may run a high priority process thread that communicates with the central management system (e.g. on a separate management interface). As will be explained in greater detail below, each process thread may periodically send and/or receive information about the virtual machine host system on which it executes, commands, and/or events processed at other virtual machine host systems. Additionally or alternatively, identification module 104 may identify the plurality of network monitoring agents by executing as a part of each of the plurality of network monitoring agents.

The term "network monitoring agent," as used herein, generally refers to any process, module, and/or computing device that inspects and/or evaluates network traffic (e.g., to make security determinations about network traffic). In some examples, a network monitoring agent may execute on a virtual machine host system (e.g., a hypervisor). For example, a hypervisor may provide the network monitoring agent as a service. Additionally or alternatively, a security virtual appliance and/or a dedicated virtual machine (e.g., hosted by a hypervisor) may execute the network monitoring agent. Accordingly, the hypervisor may be configured to forward traffic flows to the dedicated virtual machine for inspection. In some examples, a network monitoring agent may be typically responsible for monitoring traffic flows received at and/or sent from a virtual machine host system that provides and/or hosts the network monitoring agent. Thus, in some examples, a first network monitoring agent may inspect traffic flows received at the receiving virtual machine host system for compliance with at least one security policy and a second network monitoring agent may inspect the traffic flow on behalf of the receiving virtual machine host system for compliance with the security policy. However, as will be explained in greater detail below, in some examples a network monitoring agent may inspect a traffic flow on behalf of the typically responsible network monitoring agent (e.g., because the virtual machine host system on which the typically responsible network monitoring agent executes has a high processor load).

The term "virtual machine host system," as used herein, may refer to any type or form of computing device that is configured to host and/or execute one or more virtual machines. Examples of virtual machine host systems include, without limitation, hardware hypervisors, computing systems that host hypervisors, and virtual machine monitors. In addition, as will be explained in greater detail below, in some examples a networking device (e.g., an edge virtual networking device) within a virtual data center may also host a network monitoring agent and, thus, may inspect traffic flows on behalf of virtual machine host systems that receive traffic flows from and/or send traffic flows to the networking device.

The term "virtual data center," as used herein, may refers to any system for virtualizing computing resources (e.g., processing, storage, and/or network resources). In some examples, a virtual data center may provide a common computing infrastructure. As used herein, the phrase "common computing infrastructure" may refer to any set of computing resources underlying the virtualized resources provided by a virtual data center. For example, the common computing infrastructure may include one or more hypervisors, storage devices, and/or networking devices. In some examples, a virtual data center may provide data processing and/or data storage as a service (e.g., by hosting applications on behalf of one or more tenants). Accordingly, in some examples, a virtual data center may host applications and/or data for multiple tenants that may have limited or no privileges to access the applications and/or data of other tenants. In some examples, one or more tenants may provide the virtual data center with one or more security instructions and/or configurations for regulating the transmission of data as it is sent by and/or received by a virtual machine and/or hypervisor that hosts the tenant's application. In some examples, the term "virtual data center" may refer to a cloud-computing environment. As used herein, the term "cloud-computing environment" may refer to any platform or configuration of physical or virtual devices that provides remote access to applications (e.g., cloud-based applications) or services hosted on the devices.

As noted above, the plurality of network monitoring agents may inspect traffic flows within the virtual data center. The plurality of network monitoring agents may inspect traffic flows in any of a variety of ways. For example, each network monitoring agent within the plurality of network monitoring agents may inspect traffic flows by (1) providing, within a virtualized switching device that routes network traffic from a source port within the virtual network to a destination port within the virtual network, a set of software-defined-network rules containing packet inspection criteria, (2) intercepting, at the source port, a packet destined for the destination port, (3) determining that at least one characteristic of the packet satisfies at least one of the rules, and (4) in response to determining that the characteristic of the packet satisfies at least one of the rules, forwarding a copy of the packet to a virtual tap port that analyzes the copy of the packet.

As used herein, the term "virtualized switching device" may refer to any type or form of emulation or replication of a physical switching device. The terms "switching device" and "switch," as used herein, generally refer to any computing device capable of receiving data packets at an input port and directing packets to their intended destinations by forwarding the packets from an output port. In some examples, a switch may direct packets to and from devices connected within LAN or other small and/or private network. In these examples, a switch may direct a packet from one computing device to another device via a LAN based on the destination address of the packet (e.g., a Media Access Control (MAC) address). In other examples, a switch may direct packets within and/or between larger networks, such as a WAN. In these examples, a switch may analyze the Internet Protocol (IP) address of a packet in order to forward the packet to another switch that directly communicates with the destination port of the packet.

Accordingly, the virtualized switching device may represent any module and/or executable hosted on a physical device that receives and forwards packets based on characteristics (e.g., destination MAC addresses and/or IP addresses) of the packets. In some examples, the virtualized switching device may be hosted on a virtual machine (e.g., controlled by a hypervisor). In other examples, the virtualized switching device may represent all or a portion of a hypervisor that controls one or more applications hosted in a cloud-computing environment.

In addition, the virtual switching device may connect virtual machines, hypervisors, or other switches via any one or combination of layers (e.g., L1-L7) within the Open Systems Interconnection (OSI) model. In one example, the virtual switching device may connect multiple virtual machines via L2 segments. In some examples, the virtual switching device may communicate with other virtual network devices via an L2-over-L3 overlay network.

Furthermore, in some examples, virtual switch 202 may support a software-defined network protocol, such as OPENFLOW. The term "software-defined network," as used herein, generally refers to any type or form of network that separates and/or decouples the tasks of deciding how to handle network traffic (performed by a control plane) and forwarding network traffic (performed by a data plane). As opposed to a non-software-defined network that simply forwards packet via the data plane based on decisions made by the control plane, a software-defined network may enable a user to re-direct packets based on a set of software-defined-network rules.

The term "software-defined-network rules," as used herein, generally refers to any set of criteria, procedures, or conditions that specify how to handle network traffic within a software-defined network. In some examples, a set of software-defined-network rules may determine how to forward network traffic based on characteristics or properties of the network traffic. In one embodiment, when the virtual switching device receives a packet, the virtual switching device may reference a set of software-defined-network rules stored within the virtual switching device to determine how to forward the packet. For example, the virtual switching device may determine that the software-defined-network rules indicate that the packet (or a copy of the packet) should be routed along a different path or to a different device, port, IP address, or MAC address than is specified within the packet.

In some examples, the virtual switching device may represent an edge switch that connects input ports within the virtual switching device to both ports within the virtual network and ports outside of the virtual network. For example, all or a portion of the network traffic entering and leaving the virtual network may be forwarded through the virtual switching device. As such, the software-defined-network rules within the virtual switching device may identify all malicious or harmful packets distributed to or from the virtual network.

Moreover, the virtual switching device may represent or include the functionality of any one or number of switching devices. For example, the virtual switching device may be configured to emulate a particular type of physical switching device. In other examples, virtual switch 202 may be specifically configured to manage the packet forwarding and/or security services required within a particular cloud-computing environment. Notably, in these examples, the configuration of the virtual switching device may not map to the software or hardware configuration of any physical switch. As such, the virtual switching device may not be capable of being monitored by any established methods for monitoring physical switching devices.

The term "virtual network," as used herein, may refer to any logical and/or software-based medium or architecture capable of facilitating communication or data transfer. In some examples, the virtual network may represent a Virtual Local Area Network (VLAN) within a cloud-computing environment. Additionally or alternatively, the virtual network may connect one or more virtual machines inside a hypervisor. In general, the virtual network may represent any software-based protocol that transfers packets to and/or from the virtual switching device.

The term "packet," as used herein, generally refers to any type or form of package or unit of formatted data that may be received at and/or distributed from a switching device. In some examples, a packet may include control information (e.g., within the header and/or footer sections of the packet) that indicates properties of the source, destination, formatting, etc. of the packet. Additionally or alternatively, a packet may include user data (e.g., within the payload section of the packet) that represents the body or message of a packet. Examples of packets include, without limitation, IP version 4 (IPv4) packets, IP version 6 (IPv6) packets, Gateway-to-Gateway Protocol (GGP) packets, OPENFLOW packets, Internet Group Message Protocol (IGMP) packets, Transmission Control Protocol (TCP) packets, combinations of one or more of the same, or any other suitable packet.

Furthermore, the term "network traffic," as used herein, generally refers to any type or form of data transfer within and/or between one or more networks. In some examples, network traffic may involve packets passing between ports of switching devices and/or other network devices. The virtual network may facilitate network traffic via the virtual switching device by delivering and/or transferring packets to and from virtual ports within the virtual switching device. The term "virtual port," as used herein, generally refers to any type or form of virtual and/or logical interface that facilitates the transfer of packets within and/or between networks (e.g., virtual networks).

The term "source port," as used herein, generally refers to any type or form of input port that receives packets at a switching device. In addition, the term "destination port," as used herein, generally refers to any type or form of port that a packet is directed towards but has not yet reached. The term "virtual tap port," as used herein, generally refers to any type or form of virtual port configured to (or in communication with a server or virtual machine configured to) analyze packets and/or copies of packets (e.g., for indications of security threats).

Figure 4:
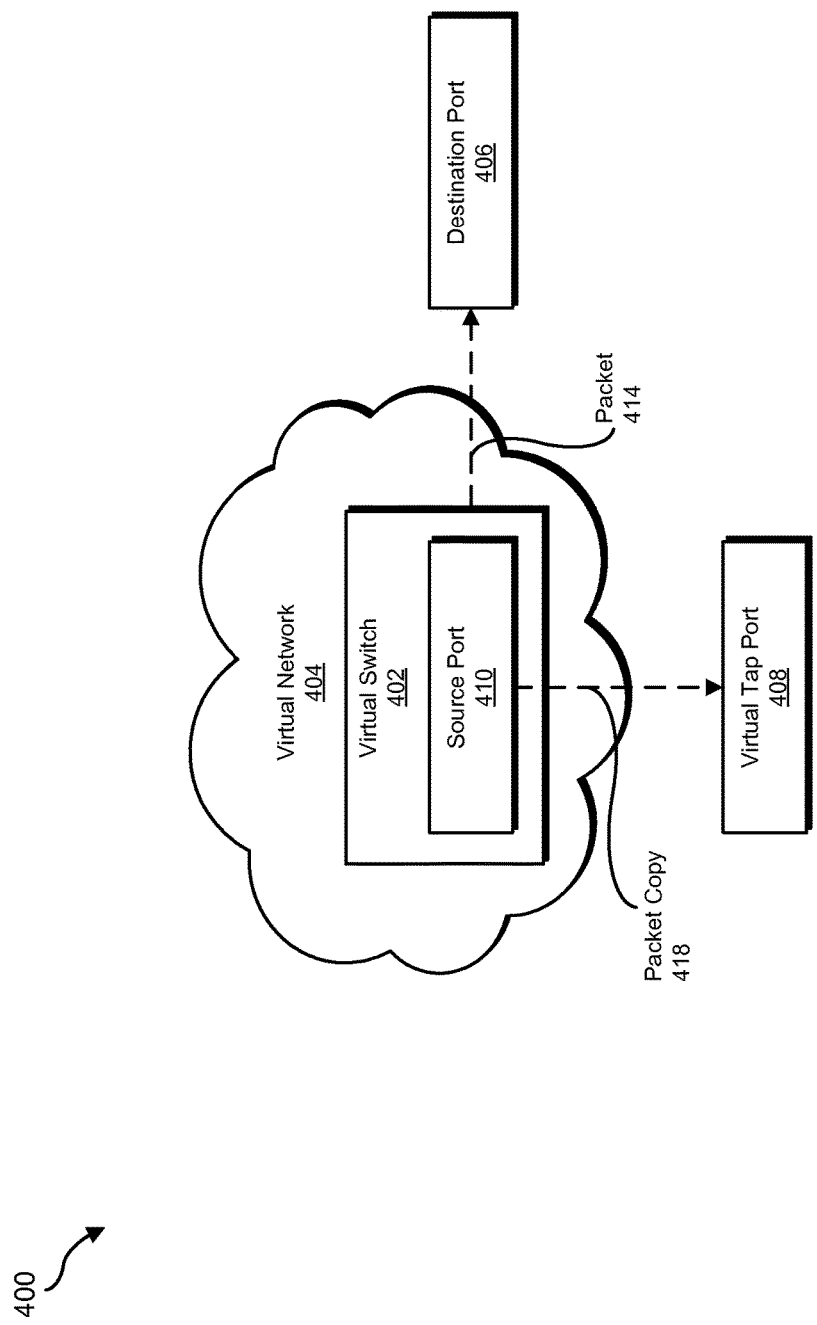
FIG. 4 is a block diagram of an exemplary computing system for scalable network monitoring in virtual data centers.

FIG. 4 illustrates an exemplary configuration of a virtual network 404 with a virtual switch 402. Using FIG. 4 as an example, virtual switch 402 may receive a packet 414 at a source port 410 and direct packet 414 to a destination port 406 (e.g., based on a specified destination address of the packet). In addition, virtual switch 402 may create a packet copy 418 of packet 414 and forward packet copy 418 to a virtual tap port 408 for inspection. As will be explained in greater detail below, in some examples virtual tap port 408 may typically represent a destination on the same virtual machine host system that hosts and/or is coupled with virtual switch 402. However, in some examples, one or more of the systems described herein may direct packet copy 418 to a different virtual machine host system.

Figure 5:
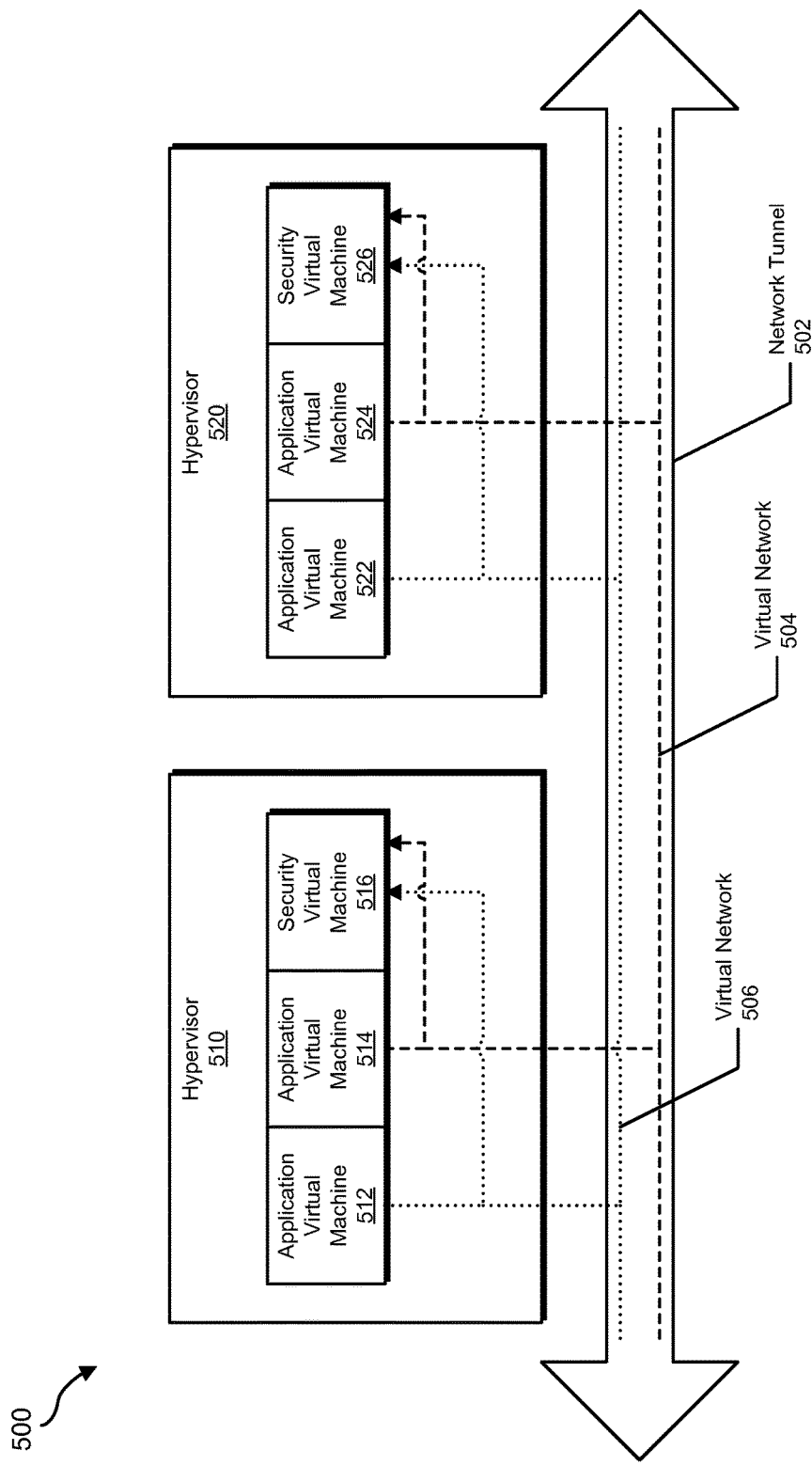
FIG. 5 is a block diagram of an exemplary computing system for scalable network monitoring in virtual data centers.

FIG. 5 illustrates an exemplary configuration of a hypervisor 510, a hypervisor 520, and a network tunnel 502. In some examples, network tunnel 502 may represent an L2-in-L3 tunnel. As shown in FIG. 5, hypervisor 510 may host application virtual machines 512 and 514 and a dedicated security virtual machine 516. Likewise, hypervisor 520 may host application virtual machines 522 and 524 and a dedicated security virtual machine 526. In one example, application virtual machines 512 and 522 and security virtual machines 516 and 526 may be connected via a virtual network 506 while application virtual machines 514 and 524 and security virtual machines 516 and 526 may be connected via a virtual network 504. Accordingly, hypervisor 510 may (e.g., via virtual switches) ordinarily copy and forward packets to and/or from application virtual machines 512 and 514 to security virtual machines 516 but, optionally, instead copy and forward such packets to another security virtual machine, such as security virtual machine 526. Likewise, hypervisor 520 may (e.g., via virtual switches) ordinarily copy and forward packets to and/or from application virtual machines 522 and 524 to security virtual machine 526 but, optionally, instead copy and forward such packets to another security virtual machine, such as security virtual machine 516.

Returning to FIG. 3, at step 304, one or more of the systems described herein may intercept, at a receiving virtual machine host system within the plurality of virtual machine host systems, a traffic flow within a virtual network that is hosted within the virtual data center, where the receiving virtual machine host system executes a first network monitoring agent within the plurality of network monitoring agents that inspects traffic flows received at the receiving virtual machine host system. For example, interception module 106 may, as part of central management system 202 in FIG. 2, intercept, at receiving virtual machine host system 212(i) within the plurality of virtual machine host systems 212, traffic flow 208 within virtual network 220 that is hosted within virtual data center 210, where receiving virtual machine host system 212(i) executes first virtual network monitoring agent 214(i) within the plurality of virtual network 204 monitoring agents that inspects traffic flows received at receiving virtual machine host system 212(i).

Interception module 106 may intercept the traffic flow in any suitable manner. For example, as discussed above, interception module 106 may intercept the traffic flow by operating as a part of and/or in conjunction with a virtual switching device (e.g., hosted on the receiving virtual machine host system). In some examples, interception module 106 may intercept the traffic flow at the receiving virtual machine host system. Additionally or alternatively, interception module 106 may intercept the traffic flow at a sending virtual machine host system that sends the traffic flow to the receiving virtual machine host system. In some examples, interception module 106 may intercept the traffic flow at an edge network device (e.g., that sends the traffic flow to the receiving virtual machine host system or that receives the traffic flow from a sending virtual machine host system).

Interception module 106 may intercept the traffic flow in any suitable context. For example, interception module 106 may intercept the traffic flow based on the traffic flow being received at the receiving virtual machine host system and determining, accordingly, that the traffic flow is subject to inspection. For example, a tenant of the virtual machine host system may have provided an inspection configuration pertaining to the virtual machine host system, one or more virtual machines that execute on the virtual machine host system, and/or one or more elements of a virtual network that are provided by the virtual machine host system. In some examples, interception module 106 may determine that the traffic flow is subject to inspection based on one or more characteristics of the traffic flow. For example, interception module 106 may determine that the traffic flow is subject to inspection based on a protocol of the traffic flow (e.g., Hypertext Transfer Protocol), an application that originated the traffic flow (e.g., an email application), a geographic region from which the traffic flow originated, and/or a geographic region to which the traffic flow is directed.

Returning to FIG. 3, at step 306, one or more of the systems described herein may determine a processor load on each of the plurality of virtual machine host systems. For example, determination module 108 may, as part of central management system 202 in FIG. 2, determine processor load 216(1)-(n) on each of the plurality of virtual machine host systems 212.

Determination module 108 may determine the processor load in any suitable manner. For example, each virtual network monitoring agent may ascertain the processor load of the virtual machine host system that hosts the virtual network monitoring agent and transmit information indicating the ascertained processor to a central management system. As discussed earlier, in some examples, each network monitoring agent may run a high priority process thread that communicates with the central management system. Accordingly, each process thread may periodically send the ascertained processor load to the central management system. In some examples, determination module 108 may determine the processor load by determining what amount and/or proportion of the processing capacity of the virtual machine host system is consumed. Additionally or alternatively, determination module 108 may determine what amount and/or proportion of the processing capacity of the virtual machine host system is spare. In some examples, determination module 108 may determine the processor load by determining what type and/or size of traffic flow (if any) a virtual security appliance running on the virtual machine host system in question can process while simultaneously maintaining a service level objective for one or more virtual machine applications executing on the virtual machine host system.

Accordingly, in some examples, determining the processor load on each of the plurality of virtual machine host systems may include (1) receiving, at a central management system, processor load information for each virtual machine host system from the plurality of network monitoring agents and (2) receiving, from the central management system, information differentiating the alternate virtual machine host system within the plurality of virtual machine host systems based on the processor load on the alternate virtual machine host system. For example, the information differentiating the alternate virtual machine host system based on the processor load on the alternate virtual machine host system may indicate that the processor load on the alternate virtual machine host system is lower relative to other virtual machine host systems.

Returning to FIG. 3, at step 308, one or more of the systems described herein may select, based on the processor load on the receiving virtual machine host system exceeding an established threshold, an alternate virtual machine host system that executes a second network monitoring agent for inspecting the traffic flow. For example, selection module 110 may, as part of central management system 202 in FIG.

2, select, based on processor load 216(*i*) on receiving virtual machine host system 212(*i*) exceeding an established threshold, alternate virtual machine host system 212(*j*) that executes second virtual network monitoring agent 214(*j*) for inspecting traffic flow 208.

As discussed earlier, in some examples the local network monitoring agent that executes on the hypervisor on which the traffic flow was intercepted may inspect the traffic flow. For example, when the processor load on the hypervisor is sufficiently low (e.g., such that dedicating processing resources to inspect the traffic flow would not negatively impact primary virtual machine applications hosted by the hypervisor), the local network monitoring agent may inspect the traffic flow. However, when the processor load exceeds the established threshold, selection module 110 may select an alternate hypervisor to which to forward the traffic flow.

Selection module 110 may use any of a variety of established thresholds. For example, the established threshold may represent a proportion of the time the receiving virtual machine host system has idle processing capacity, a projected processor capacity (e.g., for analyzing the traffic flow), and/or a processing requirement of active primary virtual machine applications on the hypervisor. In some examples, selection module 110 may establish the established threshold relative to the processor capacity of one or other virtual machine host systems. For example, selection module 110 may determine that the processor load on the receiving virtual machine host system exceeds the established threshold when the alternate virtual machine host system has a lower processor load.

In some examples, selection module 110 may select the alternate virtual machine host system because the alternate virtual machine host system sends the traffic flow to the receiving virtual machine host system. For example, selection module 110 may (1) determine that the alternate virtual machine host system sends the traffic flow to the receiving virtual machine host system and (2) select the second network monitoring agent executing on the alternate virtual machine host system to inspect the traffic flow based on determining that the alternate virtual machine host system sends the traffic flow to the receiving virtual machine host system and based on the processor load on the alternate virtual machine host system. In this manner, the systems described herein may inspect the traffic flow without requiring that the traffic flow be forwarded from the receiving virtual machine host system across network resources (because the alternate virtual machine host system, being the source of the traffic flow, may have full local access to the traffic flow). In some examples, selection module 110 may select the alternate virtual machine host system that sends the traffic flow further based on determining that the alternate virtual machine host system has spare processing capacity (e.g., such that primary applications hosted on the alternate virtual machine host system would not be negatively impacted by analyzing the traffic flow at the alternate virtual machine host system).

In some examples, the traffic flow may originate from outside the virtual data center. Accordingly, the receiving virtual machine host system may receive the traffic flow from an edge virtual network device rather than a virtual machine application. In this example, selection module 110 may select the host system that hosts the edge virtual network device.

As discussed above, in some examples selection module 110 may select the virtual machine host system that sends the traffic flow to the receiving virtual machine host system as the alternate virtual machine host system. However, in some examples, the sending virtual machine host system may lack spare processing capacity. Accordingly, selection module 110 may select a different virtual machine host system within the virtual data center. For example, selection module 110 may select the alternate virtual machine by (1) determining that a sending virtual machine host system sends the traffic flow to the receiving virtual machine host system, (2) eliminating the sending virtual machine host system as a candidate for inspecting the traffic flow to the receiving virtual machine host system based on the processor load on the sending virtual machine host system, and (3) forwarding the traffic flow to the second network monitoring agent executing on the alternate virtual machine host system based on having eliminated both the receiving virtual machine host system and the sending virtual machine host system as candidates for inspecting the traffic flow.

In some examples, when selection module 110 selects an alternate virtual machine host system that is not the virtual machine host system that sends the traffic flow, selection module 110 may attempt to select an alternate virtual machine host system based on minimizing network resource consumption. For example, if the sending virtual machine host system is unavailable, selection module 110 may attempt to find an alternate virtual machine host system within the same rack as the receiving virtual machine host system. Thus, in some examples, forwarding the traffic flow may only take one extra network hop (e.g., through the top-of-rack switch). However, if no virtual machine host system in the same rack is available (e.g., has enough spare processor capacity), selection module 110 may attempt to find an alternate virtual machine host system that shares a higher-level leaf switch with the receiving virtual machine host system. Failing to find a suitable alternate virtual machine host system on the higher-level leaf switch, selection module 110 may attempt to find an alternate virtual machine host system that connects to the receiving virtual machine host system only through a spine switch.

For example, selection module 110 may select the alternate virtual machine host system by selecting the second network monitoring agent executing on the alternate virtual machine host system to inspect the traffic flow instead of an additional candidate network monitoring agent executing on an additional candidate virtual machine host system based at least in part on a number of network hops between the receiving virtual machine host system and the additional candidate network monitoring agent exceeding a number of network hops between the receiving virtual machine host system and the alternate virtual machine host system.

Returning to FIG. 3, at step 310, one or more of the systems described herein may limit the processor load on the receiving virtual machine host system by designating the second network monitoring agent executing on the alternate virtual machine host system to inspect the traffic flow on behalf of the receiving virtual machine host system. For example, limitation module 112 may, as part of central management system 202 in FIG. 2, limit processor load 216(*i*) on receiving virtual machine host system 212(*i*) by designating the second virtual network monitoring agent 214(*j*) executing on alternate virtual machine host system 212(*j*) to inspect traffic flow 208 on behalf of receiving virtual machine host system 212(*i*).

Limitation module 112 may designate the second network monitoring agent to inspect the traffic flow in any suitable manner. In some examples, limitation module 112 may designate the second network monitoring agent by sending a message (e.g., from a central management system) to the second network monitoring agent instructing the second network monitoring agent to inspect the traffic flow. Additionally or alternatively, limitation module 112 may send a message to the alternate virtual machine host system to direct the traffic flow to the second network monitoring agent. In some examples, limitation module 112 may send a message to a virtual switch to instruct the virtual switch to copy-forward the traffic flow (and/or a relevant portion of the traffic flow) to a virtual tap port corresponding to the second network monitoring agent.

Using FIG. 5 as an example, application virtual machine 512 may send a traffic flow to application virtual machine 522. Virtual machine host system 520 may copy-forward the traffic flow to security virtual machine 526 for inspection. However, the processor load caused by application virtual machine 522 and/or application virtual machine 524 may increase. Accordingly, the systems described herein may determine that processor load on virtual machine host system 520 exceeds an established threshold (e.g., such that application virtual machine 522 and/or application virtual machine 524 would be negatively impacted if security virtual machine 526 were to inspect the traffic flow). Accordingly, the systems described herein may instruct virtual machine host system 510 to copy-forward the traffic flow to security virtual machine 516 instead. Later, the processor load caused by application virtual machine 512 and/or application virtual machine 514 may cause the processor load on virtual machine host system 510 to exceed an established threshold, so that neither virtual machine host system 510 nor virtual machine host system 520 is available to inspect the traffic flow. Accordingly, the systems described herein may instruct one of virtual machine host systems 510 and 520 to copy-forward the traffic flow to another virtual machine host system (not pictured).

As discussed above, the second network monitoring agent may inspect a policy in accordance with a security policy. The term "security policy," as used herein, generally refers to any type or form of rules or restrictions intended to detect and/or prevent security threats or breaches such as malware attacks, data leaks, unauthorized access to classified or sensitive information, etc. In some examples, a security policy may limit the type or quantity of information that is distributed from or sent to an enterprise, network, or application. Accordingly, one or more of the systems described herein may determine, at the second network monitoring agent, that the traffic flow violates the security policy and perform a security action in response to determining that the traffic flow violates the security policy. For example, these systems may alert a tenant and/or administrator of the virtual network that a DLP policy was violated. Additionally or alternatively, these systems may tighten existing security measures and/or implement new security measures within the virtual network. For example, these systems may update software-defined-network rules to include broader criteria for identifying potentially harmful network traffic (e.g., in order increase the probability of identifying subsequent security threats). In some examples, may store a record of the violation (e.g., the information that was leaked, the source of the leak, etc.) in order to identify trends of security threats. Additionally or alternatively, these systems may cause the traffic flow to stop and/or institute a firewall rule preventing a type of communication between the sending virtual machine host system and the receiving virtual machine host system. In general, these systems may perform any suitable security action in order to protect the integrity of information stored within or accessible by virtual network 204.

As explained above in connection with method 300 in FIG. 3, the systems described herein may implement a decoupled but distributed architecture for scalable network monitoring, where each compute node may host a network monitor and where the network flows processed by the network monitor may pertain to any virtual machine on any node within the virtual data center. Thus, a network monitor on a given node may process packets not only for local virtual machines, but for other virtual machines as required. A central manager may orchestrate all the network monitors across the data center and distribute the network flows based on processor load in the nodes.

A flexible tapping framework may allow these systems to sniff any flow within a virtual network from any virtual machine, virtual network interface device, and/or virtual port by copy-forwarding the flow to the destination virtual port. This technique may facilitate these systems to forward the flows to the optimal host systems based on processor load. Once a host system is chosen, the flows may be directed to a network monitor on the host system running either in, e.g., the hypervisor itself or in a security virtual appliance.

In one example, tasks for inspecting flows may be processed in the following order. (1) If the host system receiving a flow has processor cycles available, the flow is processed by the local monitoring service. (2) If the receiving host system is heavily loaded (e.g., at 95-100% capacity) and the sending host system has processor cycles available, then the flow is processed at the sending host system. This may avoid additional network traffic. If the sending host system is located outside the virtual data center (e.g., elsewhere in the Internet), the node hosting the virtual router may be considered to be the sending node. (3) If both the receiving host system and the sending host system are at a full processor load, a host system with the lightest load in the same rack as the receiving or sending host system may be chosen. (4) If all the servers in the rack are at a full processor load, a host system in the cluster outside the rack may be chosen based on its processor load.

Figure 6:
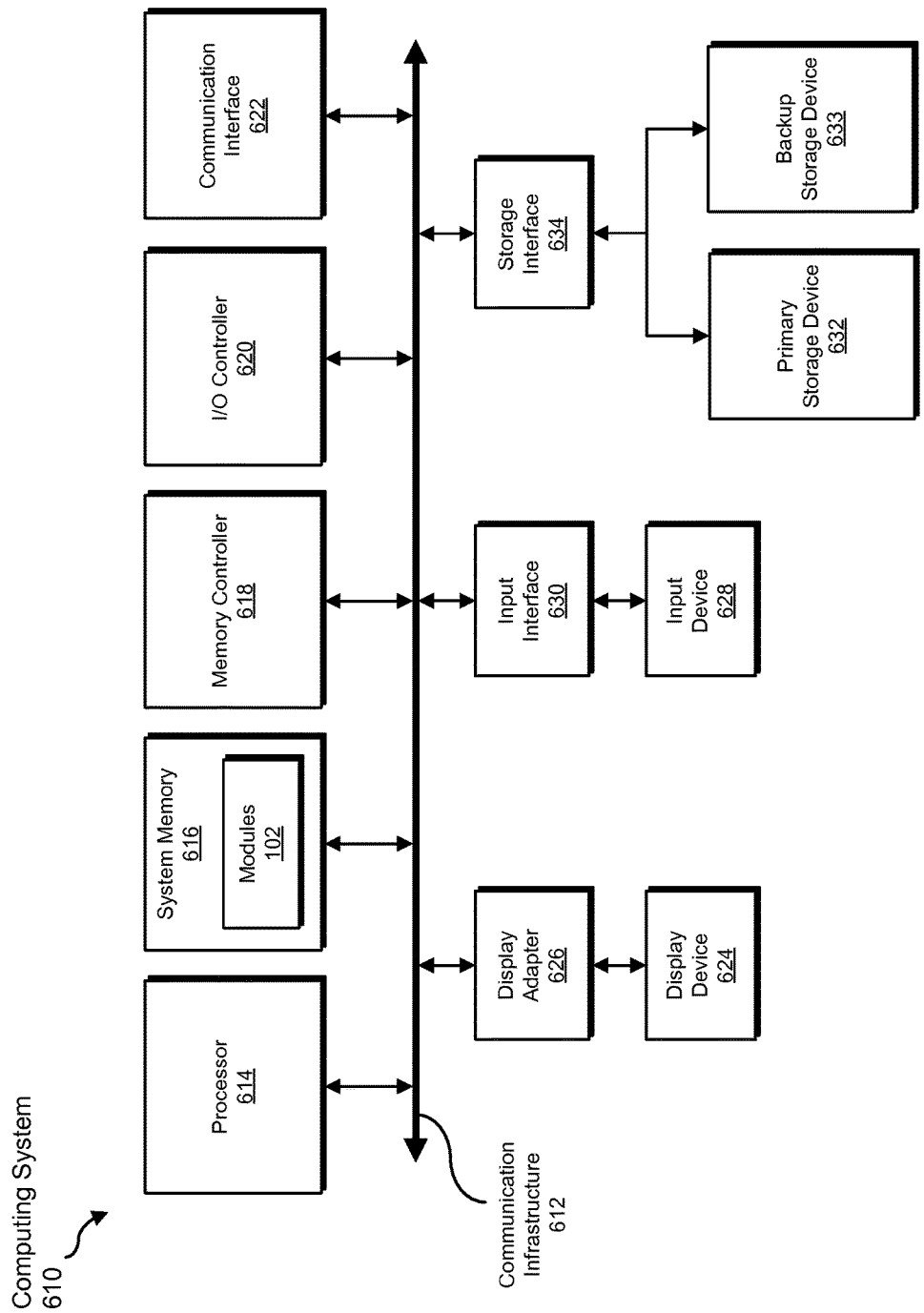
FIG. 6 is a block diagram of an exemplary computing system capable of implementing one or more of the embodiments described and/or illustrated herein.

FIG. 6 is a block diagram of an exemplary computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of physical processing unit (e.g., a hardware-implemented central processing unit) capable of processing data or interpreting and executing instructions. In certain embodiments, processor 614 may receive instructions from a software application or module. These instructions may cause processor 614 to perform the functions of one or more of the exemplary embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In certain embodiments, exemplary computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

As illustrated in FIG. 6, computing system 610 may also include at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also include at least one input device 628 coupled to communication infrastructure 612 via an input interface 630. Input device 628 generally represents any type or form of input device capable of providing input, either computer or human generated, to exemplary computing system 610. Examples of input device 628 include, without limitation, a keyboard, a pointing device, a speech recognition device, or any other input device.

As illustrated in FIG. 6, exemplary computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an Application Specific Integrated Circuit (ASIC) adapted to implement one or more of the exemplary embodiments disclosed herein.

Figure 7:
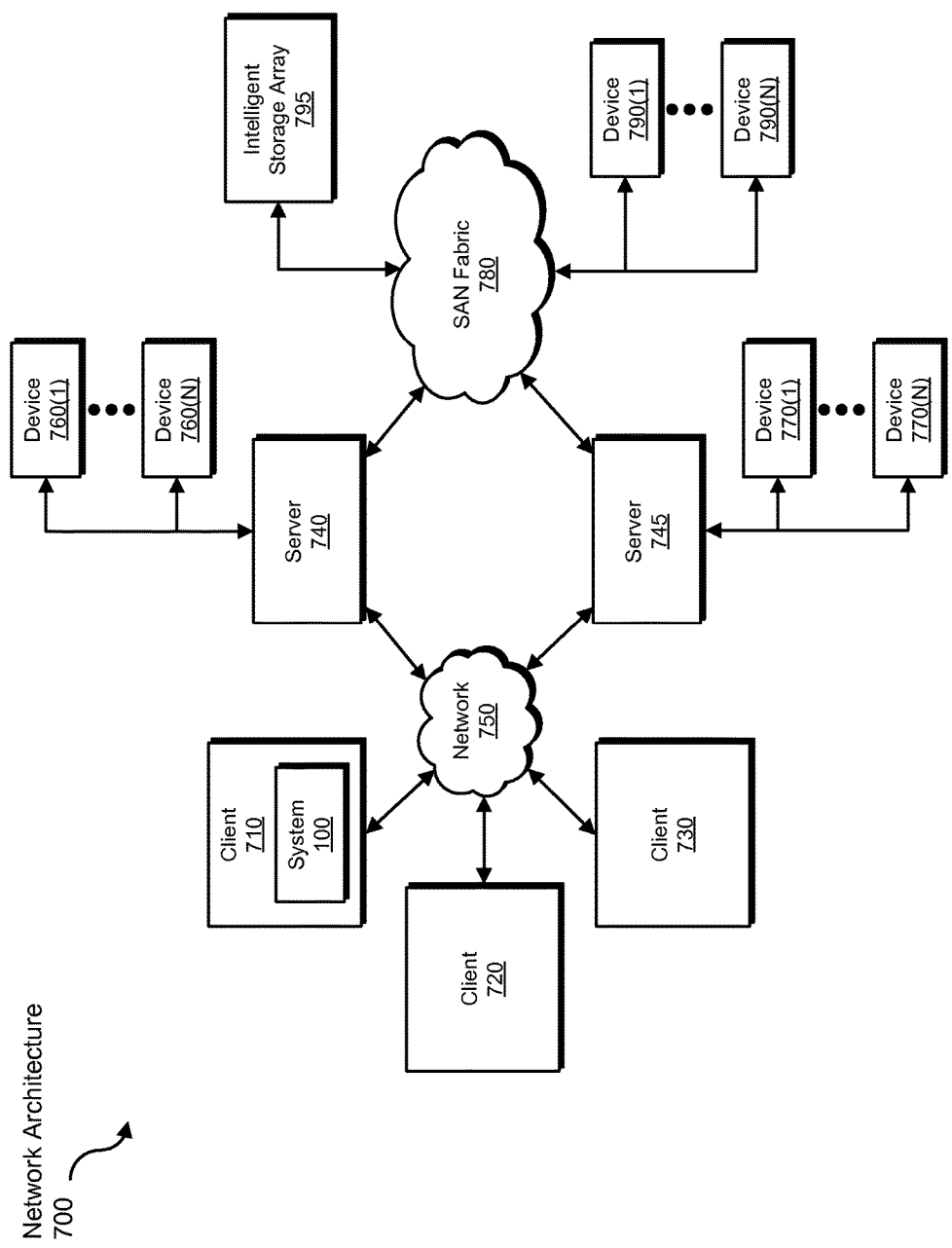
FIG. 7 is a block diagram of an exemplary computing network capable of implementing one or more of the embodiments described and/or illustrated herein.

FIG. 7 is a block diagram of an exemplary network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 3). All or a portion of network architecture 700 may also be used to perform and/or be a means for performing other steps and features set forth in the instant disclosure.

Client systems 710, 720, and 730 generally represent any type or form of computing device or system, such as exemplary computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the exemplary embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an exemplary method for scalable network monitoring in virtual data centers.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive a traffic flow to be transformed, transform the traffic flow, output a result of the transformation to a traffic flow copy, use the result of the transformation to inspect the traffic flow, and store the result of the transformation to a security log on a storage device. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for scalable network monitoring in virtual data centers, at least a portion of the method being performed by a computing device comprising at least one processor, the method comprising:
    identifying a plurality of network monitoring agents executing on a plurality of virtual machine host systems within a virtual data center;
    intercepting, at a receiving virtual machine host system within the plurality of virtual machine host systems, a traffic flow within a virtual network that is hosted within the virtual data center from a sending virtual machine host system within the plurality of virtual machine host systems, wherein the receiving virtual machine host system executes a first network monitoring agent within the plurality of network monitoring agents that inspects traffic flows received at the receiving virtual machine host system;
    determining a processor load on each of the plurality of virtual machine host systems;
    selecting, based on the processor load on the receiving virtual machine host system exceeding an established threshold, an alternate virtual machine host system that executes a second network monitoring agent for inspecting the traffic flow; and
    limiting the processor load on the receiving virtual machine host system by designating the second network monitoring agent executing on the alternate virtual machine host system to inspect the traffic flow between the sending virtual machine host system and the receiving virtual machine host system on behalf of the receiving virtual machine host system instead of the first network monitoring agent, wherein each network monitoring agent within the plurality of network monitoring agents inspects traffic flows by:
        providing, within a virtualized switching device that routes network traffic from a source port within the virtual network to a destination port within the virtual network, a set of software-defined-network rules containing packet inspection criteria;
        intercepting, at the source port, a packet destined for the destination port;
        determining that at least one characteristic of the packet satisfies at least one of the rules; and
        in response to determining that the characteristic of the packet satisfies at least one of the rules, forwarding a copy of the packet to a virtual tap port that analyzes the copy of the packet.

2. The computer-implemented method of claim 1, wherein selecting the alternate virtual machine host system comprises:
    determining that the alternate virtual machine host system sends the traffic flow to the receiving virtual machine host system; and
    selecting the second network monitoring agent executing on the alternate virtual machine host system to inspect the traffic flow based on determining that the alternate virtual machine host system sends the traffic flow to the receiving virtual machine host system and based on the processor load on the alternate virtual machine host system.

3. The computer-implemented method of claim 1, wherein selecting the alternate virtual machine host system comprises:
    determining that the sending virtual machine host system sends the traffic flow to the receiving virtual machine host system;
    eliminating the sending virtual machine host system as a candidate for inspecting the traffic flow to the receiving virtual machine host system based on the processor load on the sending virtual machine host system; and
    forwarding the traffic flow to the second network monitoring agent executing on the alternate virtual machine host system based on having eliminated both the receiving virtual machine host system and the sending virtual machine host system as candidates for inspecting the traffic flow.

4. The computer-implemented method of claim 3, wherein selecting the alternate virtual machine host system further comprises selecting the second network monitoring agent executing on the alternate virtual machine host system to inspect the traffic flow instead of an additional candidate network monitoring agent executing on an additional candidate virtual machine host system based at least in part on a number of network hops between the receiving virtual machine host system and the additional candidate network monitoring agent exceeding a number of network hops between the receiving virtual machine host system and the alternate virtual machine host system.

5. The computer-implemented method of claim 1, wherein:
    the first network monitoring agent inspects traffic flows received at the receiving virtual machine host system for compliance with at least one security policy; and
    the second network monitoring agent inspects the traffic flow on behalf of the receiving virtual machine host system for compliance with the security policy.

6. The computer-implemented method of claim 5, further comprising:
    determining, at the second network monitoring agent, that the traffic flow violates the security policy; and
    performing a security action in response to determining that the traffic flow violates the security policy.

7. The computer-implemented method of claim 1, wherein determining the processor load on each of the plurality of virtual machine host systems comprises:
    receiving, at a central management system, processor load information for each virtual machine host system from the plurality of network monitoring agents;

receiving, from the central management system, information differentiating the alternate virtual machine host system within the plurality of virtual machine host systems based on the processor load on the alternate virtual machine host system.

8. The computer-implemented method of claim 1, wherein intercepting the traffic flow comprises determining that the traffic flow is subject to inspection based on the traffic flow being received at the receiving virtual machine host system.

9. The computer-implemented method of claim 1, wherein intercepting the traffic flow comprises determining that the traffic flow is subject to inspection based on at least one of:
   a protocol of the traffic flow;
   an application that originated the traffic flow;
   a geographic region from which the traffic flow originated; and
   a geographic region to which the traffic flow is directed.

10. A system for scalable network monitoring in virtual data centers, the system comprising:
   an identification module, stored in memory, that identifies a plurality of network monitoring agents executing on a plurality of virtual machine host systems within a virtual data center;
   an interception module, stored in memory, that intercepts, at a receiving virtual machine host system within the plurality of virtual machine host systems, a traffic flow within a virtual network that is hosted within the virtual data center from a sending virtual machine host system within the plurality of virtual machine host systems, wherein the receiving virtual machine host system executes a first network monitoring agent within the plurality of network monitoring agents that inspects traffic flows received at the receiving virtual machine host system;
   a determination module, stored in memory, that determines a processor load on each of the plurality of virtual machine host systems;
   a selection module, stored in memory, that selects, based on the processor load on the receiving virtual machine host system exceeding an established threshold, an alternate virtual machine host system that executes a second network monitoring agent for inspecting the traffic flow;
   a limitation module, stored in memory, that limits the processor load on the receiving virtual machine host system by designating the second network monitoring agent executing on the alternate virtual machine host system to inspect the traffic flow between the sending virtual machine host system and the receiving virtual machine host system on behalf of the receiving virtual machine host system instead of the first network monitoring agent; and
   at least one physical processor configured to execute the identification module, the interception module, the determination module, the selection module, and the limitation module, wherein each network monitoring agent within the plurality of network monitoring agents inspects traffic flows by:
      providing, within a virtualized switching device that routes network traffic from a source port within the virtual network to a destination port within the virtual network, a set of software-defined-network rules containing packet inspection criteria;
      intercepting, at the source port, a packet destined for the destination port;
      determining that at least one characteristic of the packet satisfies at least one of the rules; and
      in response to determining that the characteristic of the packet satisfies at least one of the rules, forwarding a copy of the packet to a virtual tap port that analyzes the copy of the packet.

11. The system of claim 10, wherein the selection module selects the alternate virtual machine host system by:
   determining that the alternate virtual machine host system sends the traffic flow to the receiving virtual machine host system; and
   selecting the second network monitoring agent executing on the alternate virtual machine host system to inspect the traffic flow based on determining that the alternate virtual machine host system sends the traffic flow to the receiving virtual machine host system and based on the processor load on the alternate virtual machine host system.

12. The system of claim 10, wherein the selection module selects the alternate virtual machine host system by:
   determining that the sending virtual machine host system sends the traffic flow to the receiving virtual machine host system;
   eliminating the sending virtual machine host system as a candidate for inspecting the traffic flow to the receiving virtual machine host system based on the processor load on the sending virtual machine host system; and
   forwarding the traffic flow to the second network monitoring agent executing on the alternate virtual machine host system based on having eliminated both the receiving virtual machine host system and the sending virtual machine host system as candidates for inspecting the traffic flow.

13. The system of claim 12, wherein the selection module selects the alternate virtual machine host system further by selecting the second network monitoring agent executing on the alternate virtual machine host system to inspect the traffic flow instead of an additional candidate network monitoring agent executing on an additional candidate virtual machine host system.

14. The system of claim 13, wherein the selection module selects the alternate virtual machine host system further by selecting the second network monitoring agent executing on the alternate virtual machine host system to inspect the traffic flow instead of the additional candidate network monitoring agent executing on the additional candidate virtual machine host system based at least in part on a number of network hops between the receiving virtual machine host system and the additional candidate network monitoring agent exceeding a number of network hops between the receiving virtual machine host system and the alternate virtual machine host system.

15. The system of claim 10, wherein:
   the first network monitoring agent inspects traffic flows received at the receiving virtual machine host system for compliance with at least one security policy; and
   the second network monitoring agent inspects the traffic flow on behalf of the receiving virtual machine host system for compliance with the security policy.

16. The system of claim 15, further comprising:
   determining, at the second network monitoring agent, that the traffic flow violates the security policy; and
   performing a security action in response to determining that the traffic flow violates the security policy.

17. The system of claim 10, wherein the determination module determines the processor load on each of the plurality of virtual machine host systems by:

receiving, at a central management system, processor load information for each virtual machine host system from the plurality of network monitoring agents; and receiving, from the central management system, information differentiating the alternate virtual machine host system within the plurality of virtual-machine host systems based on the processor load on the alternate virtual machine host system.

18. The system of claim 10, wherein the interception module intercepts the traffic flow by determining that the traffic flow is subject to inspection based on the traffic flow being received at the receiving virtual machine host system.

19. A non-transitory computer-readable medium comprising one or more computer-readable instructions that, when executed by at least one processor of a computing device, cause the computing device to:

identify a plurality of network monitoring agents executing on a plurality of virtual machine host systems within a virtual data center;

intercept, at a receiving virtual machine host system within the plurality of virtual machine host systems, a traffic flow within a virtual network that is hosted within the virtual data center from a sending virtual machine host system within the plurality of virtual machine host systems, wherein the receiving virtual machine host system executes a first network monitoring agent within the plurality of network monitoring agents that inspects traffic flows received at the receiving virtual machine host system;

determine a processor load on each of the plurality of virtual machine host systems;

select, based on the processor load on the receiving virtual machine host system exceeding an established threshold, an alternate virtual machine host system that executes a second network monitoring agent for inspecting the traffic flow; and limit the processor load on the receiving virtual machine host system by designating the second network monitoring agent executing on the alternate virtual machine host system to inspect the traffic flow between the sending virtual machine host system and the receiving virtual machine host system on behalf of the receiving virtual machine host system instead of the first network monitoring agent, wherein each network monitoring agent within the plurality of network monitoring agents inspects traffic flows by:

providing, within a virtualized switching device that routes network traffic from a source port within the virtual network to a destination port within the virtual network, a set of software-defined-network rules containing packet inspection criteria;

intercepting, at the source port, a packet destined for the destination port;

determining that at least one characteristic of the packet satisfies at least one of the rules; and in response to determining that the characteristic of the packet satisfies at least one of the rules, forwarding a copy of the packet to a virtual tap port that analyzes the copy of the packet.

* * * * *